M. GROSSMAN.
GLASS FASTENING DEVICE.
APPLICATION FILED JAN. 19, 1921.
1,428,955.
Patented Sept. 12, 1922.
FIG. I.
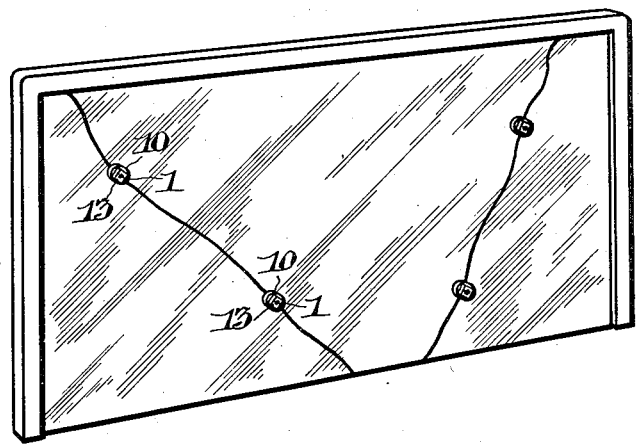
FIG. II.
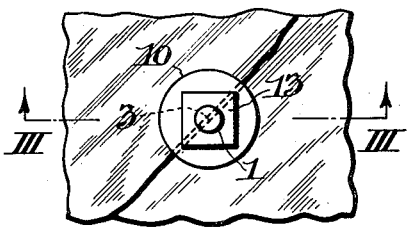
FIG. V.
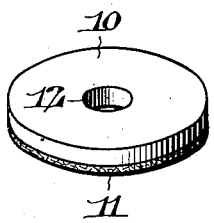
FIG. III.
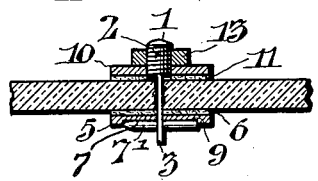
FIG. VI.
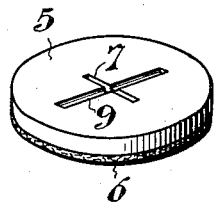
FIG. IV.
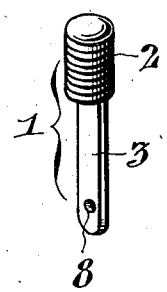
WITNESSES:
INVENTOR:
Meyer Grossman,
BY
ATTORNEYS.

Patented Sept. 12, 1922.

1,428,955

UNITED STATES PATENT OFFICE.

MEYER GROSSMAN, OF PHILADELPHIA, PENNSYLVANIA.

GLASS-FASTENING DEVICE.

Application filed January 19, 1921. Serial No. 438,325.

*To all whom it may concern:*

Be it known that I, MEYER GROSSMAN, a citizen of the United States, residing in the city of Philadelphia, in the county of Philadelphia and State of Pennsylvania, have invented certain new and useful Improvements in Glass-Fastening Devices, whereof the following is a specification, reference being had to the accompanying drawings.

The invention relates generally to fastening devices useful in securing together abutting edges of glass panes, and more specifically to a type of fastening device especially adapted for use in emergency, for example, in uniting segments of broken or fractured automobile wind shields, windows, show cases, etc.

The prerequisite of fastening device especially suited for the stated purpose is that it be so constructed as to make quick and ready attachment possible without necessitating aid of any special tools in effecting such attachment. This desiderata I have embodied in a fastening device whose construction and characteristic advantages will be readily understood from the detailed description which follows:

In the drawings, Fig. I is a perspective view showing fastening devices constructed according to my invention applied to a fractured and broken wind shield of an automobile.

Fig. II is an enlarged view showing to better advantage the manner in which the device is used in securing together the adjacent edges of a break or fissure in the glass.

Figure III is a cross sectional view along the line III—III in Fig. II.

Fig. IV is a perspective view of one of the constituent elements of the device in the form of a stem.

Fig. V is a perspective view of a washer which is attachable to one end of the stem, and adapted to overlap the margins of adjacent sections or segments of the glass.

Fig. VI is a perspective view of a similar washer adapted for attachment to the other end of the stem.

Referring more particularly to Figs. II and III, it will be noted that the device includes a stem 1, having a cylindrical end 2 which is screw threaded as shown, and an integral central extension in the form of a flat shank or blade 3 purposely made very thin, so as to be capable of being inserted into the fissure or rent between the segments of the broken glass pane, as clearly shown in Fig. III. A washer 5, preferably of fibre and lined upon one face with leather or felt as conventionally shown at 6 in Fig. VI, is centrally slitted as at 7 to receive the end of the shank 3 of the stem. In the assemblage, the washer is held in place by a removable pin 7' adapted to be inserted through a transverse aperture 8 in the end of the shank 3, and which is held from displacement in a retaining groove or seat 9 in the outer face of said washer. In practice, the washer is made sufficiently large in diameter to overlap considerable margins of adjacent sections of the glass, in order to render substantial support at the region of juncture.

A second washer 10, adapted for performing a similar office upon the opposite side of the glass pane in opposition to the washer 5, is shown in perspective in Fig. V. Washer 10 has a facing 11 of leather or felt similar to that of the washer 5, and is centrally apertured as at 12 for accommodation of the threaded end 2 of the stem 1. A nut 13 is provided for engaging the threaded portion of the stem 1, and serves to draw upon the latter in securing the constituent elements of the device in assemblage on the glass pane.

The manner in which the device may be quickly applied to the broken glass in cases of emergency may be briefly described as follows:

The flat, thin shank 3 of the stem is first inserted through the fissure or rent in the glass as far as permitted by the shoulder of the end 2. The washer 5 with its felted side innermost is then slipped on the protruding end of the shank 3,—the pin inserted through the aperture 8,—and the shank pushed inward to position the pin in its retaining groove. The washer 10 is next placed in proper position on the opposite protruding end of the stem with its felted face next to the glass,—and lastly, the nut 13 screwed on the threaded portion of the stem. When the nut 13 is brought home, by aid of an ordinary wrench or a pair of pliers, it will be seen that the washers 5 and 10 are securely clamped against the opposite sides of the glass pane, and the pin 7', at the same time, drawn into positive engagement within its retaining groove 9 of the washer 5, and thus firmly held against axial displacement.

In applying the fastening devices to broken wind shields, I prefer to locate them, as shown in Fig. I, one near each end of the fissure or break in the glass. From experience, I have found that two fasteners are ample to hold the adjacent edges of the glass segments in proper alignment, and when placed as suggested, are comparatively inconspicuous and hence do not appreciably obstruct vision through the shield. While I have shown and described my invention as especially adapted for use in emergencies, it is obvious that it may be applied with equal advantages where permanent repairs are to be made.

Having thus described my invention, I claim:

1. A repairing device for fractured glass panes comprising a relatively thin flat element of sufficient cross-sectional area to resist the tension necessarily applied thereto in use to perform its function, whereby one end of said element may be inserted through the fissure of a fractured pane without unduly spacing the edges of the fissure and with the ends of the element protruding beyond the sides of the pane, the entering end of the element being free from projections or extensions and formed to enter the fissure with a minimum amount of resistance, a clamping device to be applied over the entering end of the element to engage one side of the pane and overlap the margins of the fissure, a separable means to engage the entering end of the element to prevent withdrawal of the element from its associated clamping device, a second clamping device applicable over the following end of the element to engage the other side of the pane and overlap the margins of the fissure, and a means cooperating with said following end of the element to tension the same and thus bind the pane between the clamping devices.

2. A repairing device for fractured glass panes comprising a very thin flat element having a cross sectional area sufficient to successfully resist the amount of tension to be applied thereto in use to perform its function, whereby one end may be inserted through the fissure of a broken pane with the ends protruding beyond the faces of the pane, the entering end being free from projections or extensions and formed to enter the fissure with a minimum amount of resistance, said entering end having a perforation, a washer applied to said entering end to engage one face of the pane and to overlap the margins of the fissure, a pin inserted through the perforation to prevent withdrawal of the element from the washer, a second washer applied to the following end of the element to engage the other side of the pane and to overlap the margins of the fissure, and means engaging said following end of the element to tension the same and thus bind the pane between the washers.

3. A fastening device of the character described comprising an element in the form of a stem having a screw threaded end from which extends centrally, as an axially integral prolongation, a comparatively long flat shank which is sufficiently thin as to be capable of insertion through a fissure of a fractured or broken pane of glass; a washer attachable upon the end of the shank of the stem for overlapping the margins of the fissure at one side of the pane, a pin engageable within a transverse aperture in the protruding end of the shank and adapted to be held in place within a retaining groove in the outer face of the washer; a second washer for overlapping the margins of the fissure upon the other side of the pane of glass, said washer being centrally apertured to fit about the threaded end of the shank; and a cooperative nut engageable with the stem to secure the several constituent elements of the device in assemblage.

In testimony whereof, I have hereunto signed my name at Philadelphia, Pennsylvania, this 12th day of January, 1921.

MEYER GROSSMAN.

Witnesses:
 JAMES H. BELL,
 E. L. FULLERTON.